No. 821,593. PATENTED MAY 22, 1906.
L. J. LINDSAY.
MARKER FOR CORN PLANTERS.
APPLICATION FILED OCT. 6, 1905.
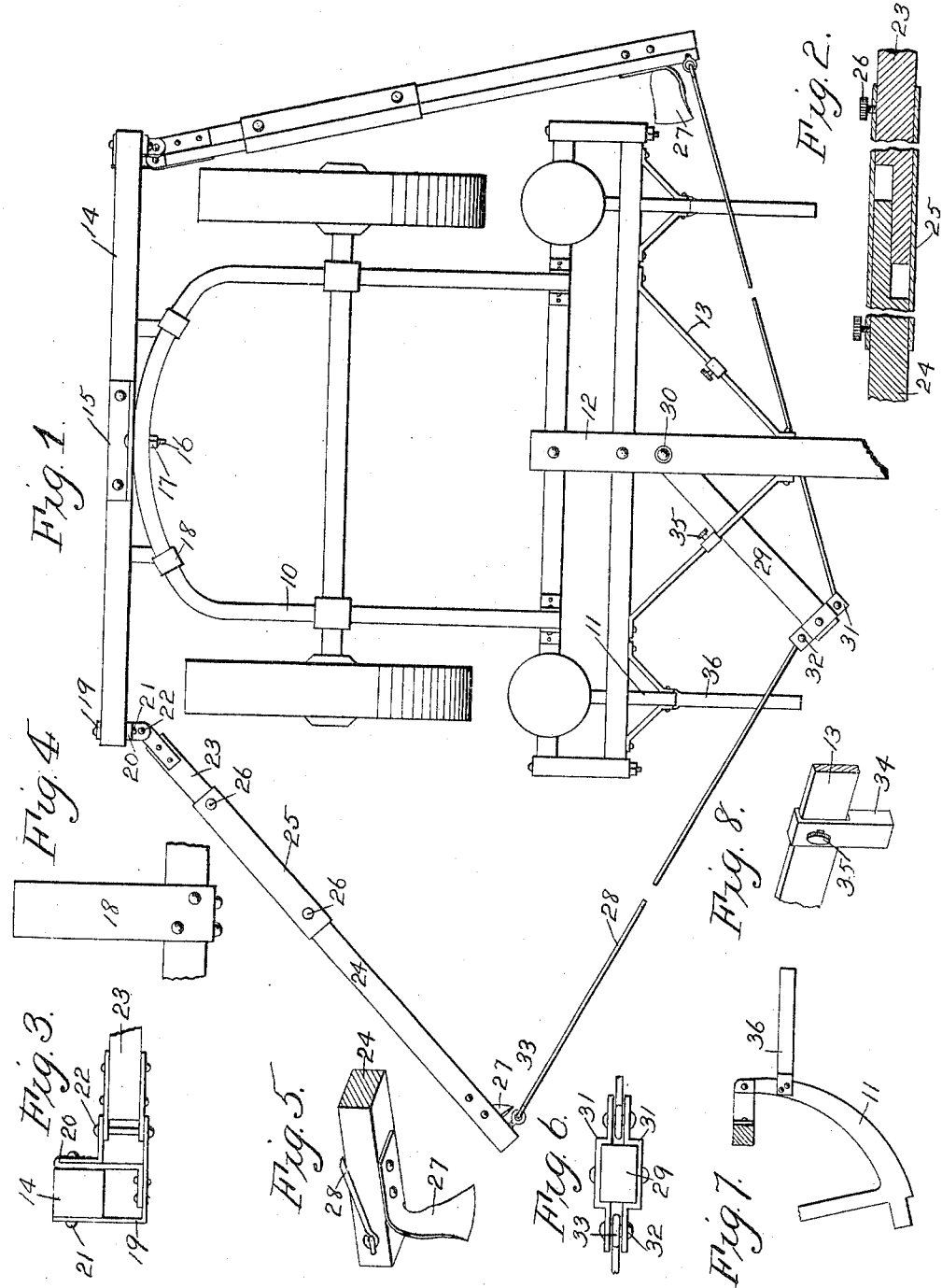
Witnesses
R. L. Spencer.
S. F. Christy.
Inventor L. J. Lindsay
by Orwig & Lane
Attys.

UNITED STATES PATENT OFFICE.

LEROY J. LINDSAY, OF SEYMOUR, IOWA, ASSIGNOR OF ONE-HALF TO JAMES E. ARMINTROUT AND ONE-HALF TO IRA E. ARMINTROUT, OF SEYMOUR, IOWA.

MARKER FOR CORN-PLANTERS.

No. 821,593.  Specification of Letters Patent.  Patented May 22, 1906.

Application filed October 6, 1905. Serial No. 281,620.

*To all whom it may concern:*

Be it known that I, LEROY J. LINDSAY, a citizen of the United States, residing at Seymour, in the county of Wayne and State of Iowa, have invented a certain new and useful Marker for Corn-Planters, of which the following is a specification.

The object of my invention is to provide a device to be used in the nature of an attachment to be applied to a corn-planter for the purpose of forming a mark at the side of the corn-planter as the planter is advancing over a field and to automatically fold the marker-arm on one side of the planter to an inoperative position adjacent to the planter and at the same time automatically extend the marker-arm on the other side to an operative position during the time that the planter is turning around at the end of a field.

My invention consists in the construction, arrangement, and combination of the various parts of the device whereby the objects contemplated are attained, as hereinafter more fully set forth, pointed out in my claims, and illustrated in the accompanying drawings, in which—

Figure 1 shows a top or plan view of a corn-planter with my improved marker applied thereto as in practical use. Fig. 2 shows a detail sectional view illustrating the means for adjusting the marker-arms. Fig. 3 shows a detail side view of the means for pivotally supporting the marker-arms on the supporting-beam at the rear of the planter-frame. Fig. 4 shows a detail view illustrating one of the supporting devices for connecting the beam to the planter-frame. Fig. 5 shows a detail perspective view of the outer end of one of the marker-arms, illustrating the marker-blade. Fig. 6 shows a detail front view of the swinging arm to which the marker-connecting rods are attached, illustrating the means for connecting the rods with the swinging arm. Fig. 7 shows a detail side view of one of the planter-runners or furrow-openers with the bracket attached thereto for supporting the marker-arm-connecting rods, and Fig. 8 shows a detail perspective view illustrating one of the adjustable stops for limiting the movement of the swinging arm.

Referring to the accompanying drawings, I have used the reference-numeral 10 to indicate the planter-frame. In the drawings the planter-frame is shown with its rear end bowed rearwardly. In this case it is to be understood that in many planter-frames this part is straight, and my invention is designed to be attached to either form of frame, as will hereinafter appear.

The numeral 11 indicates the runners or furrow-openers, of the ordinary form, and 12 the tongue. 13 indicates braces connected to the tongue and with the front of the frame.

My invention does not relate to the planter itself. Hence further description of it is unnecessary.

My marker attachment comprises a supporting-beam which may be made of wood and which is indicated by the numeral 14. It is of a length to extend across the rear of the machine to points beyond the wheels. I attach the beam to the frame as follows: 15 indicates an angular plate secured to the top of a beam, with its front projecting upwardly from the base. A bolt 16 passes through this front extension and through the rear of the planter-frame, and a nut 17 on the bolt clamps the frame to the plate. To support the ends of the beams 14 against tilting movements, I have provided on each end portion a pliable-metal attaching-clip 18, designed to be attached to the frame by projecting it upwardly inside of the rear end of the frame and then rearwardly over the top thereof. Said clips are of such lengths that they will engage equally well with frames having arched rear ends and frames having straight rear ends, and no bolts or other fastening devices are necessary, as said clips only prevent tilting movements of the beam. At each end of the beam is a bracket for supporting the marker-arm. Each bracket is formed complete of two pieces of strap-iron, the part 19 extending straight downwardly at the rear of the beam and then forwardly under the beam, the other part 20 doubled at its central portion and having a part extending forwardly above the forward end of the part 19 and also a part extending downwardly and riveted to the part 19. A bolt 21 is passed through the beam and through the upwardly-extending portions of the straps 19 and 20 to pivotally connect said parts with the beam, and a bolt 22 passes through the forwardly-extending portions of the straps 19 and 20 to pivotally connect the marker-arm between them. In this way the marker-arm is made capable of universal movement relative to the beam. Each marker-arm is made adjustable longitudinally, and this is preferably done as follows: The numeral 23 indicates the inner end of the marker-arm, and 24 the outer end. 25 indicates a sleeve designed to slidingly receive the adjacent ends of the part 23 and 24, and set-screws 26 are passed through said sleeve to engage the adjacent ends of the marker-arm to adjustably clamp them in the sleeve. Said arms, however, may be made adjustable longitudinally in any ordinary way. At the outer end of the marker-arm is the marker-blade 27, designed to form a furrow in the ground as the planter is advancing. Said marker-blade is so shaped that as it passes through the ground it will tend to throw the arm outwardly and rearwardly relative to the planter. Pivoted to the outer end of the marker-arm is a rigid connecting-rod 28. Pivoted to the tongue 12 is a swinging arm 29, supported beneath the tongue by the bolt 30. The rods 28 are attached to the arms 29 as follows: The numeral 31 indicates two metal straps riveted to the top and bottom of the arm 29, with their ends extending outwardly at the sides of the arm and spaced apart. Bolts 32 are passed through these ends, and the rods 28 are formed with loops 33 to enter between the ends of the parts 31 and encircle the bolts 32.

I have provided for limiting the swinging movement of the arm 29 as follows: Mounted upon each of the brace-bars 13 is a stop 34, provided with a set-screw 35 to engage the brace. This stop projects downwardly from the brace into the path of the arm 29. I have also provided means for elevating the forward ends of the marker-arms as they swing inwardly toward the planter as follows: On each of the runners 11 is a connecting-rod guide-arm 36, attached to the runners and projecting forwardly therefrom beneath the adjacent connecting-rod 28.

In practical use the marker device may be attached to any ordinary planter by connecting the beam 14 with the planter-frame, then attaching the swinging arm 29 to the tongue, and then securing the adjustable stops 34 and the rod-supporting arms 36 in the positions shown and described. Then the marker-arms are adjusted to a length so that the marker-blades will engage the ground-surface at the proper point when either of them is in its position extending rearwardly from the frame with the swinging arm in engagement with the proper one of the stops 34. Assuming the marker to be in the position shown in Fig. 1 and the planter advancing over a field in a straight line, the marker-arm may freely move up and down to conform to the contour of the ground. The opposite marker-arm will, however, be supported in position adjacent to the planter-frame and elevated above the ground by the rod 28 engaging the supporting-bracket 36, as shown in Fig. 1. When the machine is turning around at the end of a furrow, it is turned toward the side having the marker-arm in engagement with the ground. This will cause the rigid connecting-arms 28 to swing the arm 29 to its opposite limit of movement, thus projecting the other marker-arm to its outer limit of movement and drawing the marker-arm that was previously in engagement with the ground toward the frame and elevating it as it approaches the supporting-arm 36.

Having thus described my invention, what I claim, and desire to secure by Letters Patent of the United States therefor, is—

1. The combination with a planter, of a marker-arm pivotally supported on the planter-frame, a swinging arm pivotally supported on the marker-frame in front of the marker-arm, and a connecting device attached to the marker-arm and the swinging arm.

2. The combination with a planter, of a marker-arm pivotally supported on the planter-frame, a swinging arm pivotally supported on the marker-frame in front of the marker-arm, a connecting device attached to the marker-arm and the swinging arm, and a bracket attached to the planter-frame to engage the connecting means and thereby elevate the marker-arm when moved to a position adjacent to the planter-frame.

3. The combination with a planter, of a marker-arm pivotally supported on the planter-frame, a swinging arm pivotally supported on the planter-frame in front of the marker-arm, and a connecting device attached to the marker-arm and the swinging arm, and a stop for limiting the movement of the swinging arm.

4. The combination with a planter, of a marker-arm pivotally supported on the planter-frame, a swinging arm pivotally supported on the planter-frame in front of the marker-arm, and a connecting device attached to the marker-arm and the swinging arm, and an adjustable stop for limiting the movement of the swinging arm.

5. The combination with a planter-frame, of a supporting-beam fixed to the rear thereto, a marker-arm pivotally attached to each end of the beam, and a connecting means attached to the forward ends of the marker-arm and extending across the front of the planter-frame, and means coacting with the connecting means attached to the front of the planter-frame for elevating the marker-arm as it swings toward the planter-frame, said means permitting the marker-arm to move downwardly as it swings away from the planter-frame.

6. The combination with a planter-frame of two marker-arms pivotally supported at the rear of the planter-frame, rigid connecting-rods pivoted to the front ends of the marker-arms and a swinging arm pivoted at the front of the planter-frame and pivotally connected with both of the said rods.

7. The combination with a planter-frame of two marker-arms pivotally supported at the rear of the planter-frame, rigid connecting-rods pivoted to the front ends of the marker-arms, a swinging arm pivoted at the front of the planter-frame and pivotally connected with both of the said rods, and an adjustable stop for limiting swinging movement of said arms.

8. The combination with a planter-frame of two marker-arms pivotally supported at the rear of the planter-frame, rigid connecting-rods pivoted to the front ends of the marker-arms, a swinging arm pivoted at the front of the planter-frame and pivotally connected with both of the said rods, and a bracket secured to the planter-frame to be engaged by the rods and to elevate the forward ends of the marker-arms as they swing toward the planter-frame.

9. The combination with a planter-frame of two marker-arms pivotally supported at the rear of the planter-frame, rigid connecting-rods pivoted to the front ends of the marker-arms, a swinging arm pivoted at the front of the planter-frame and pivotally connected with both of the said rods, and means for adjusting the marker-arms longitudinally.

10. In a marker attachment for a planter, the combination of a beam, an angular plate secured to the central portion of the beam, a single bolt in the angular plate to be attached to the planter-frame and two pliable-metal straps secured to the beam and capable of folding over the rear of a planter-frame to prevent tilting movements of the beam.

LEROY J. LINDSAY.

Witnesses:
SAM BONNER,
J. W. SPEERS.